United States Patent [19]

Shyu et al.

[11] Patent Number: 5,737,492
[45] Date of Patent: Apr. 7, 1998

[54] FUZZY LOGIC MEMBERSHIP FUNCTION GENERATING APPARATUS

[75] Inventors: Jyuo-Min Shyu; Yao-Chou Lu, both of Hsinchu; Hsi-Chou Deng, Chupei; Hsu-Huang Cheng, Tainan, all of Taiwan

[73] Assignee: Industrial Technology Research Institute, Hsinchu, Taiwan

[21] Appl. No.: 504,451

[22] Filed: Jul. 20, 1995

Related U.S. Application Data

[63] Continuation-in-part of Ser. No. 53,081, Apr. 26, 1993, abandoned.
[51] Int. Cl.$^6$ ................................................ G06F 9/44
[52] U.S. Cl. .............................. 395/3; 395/51; 395/900
[58] Field of Search .................................. 395/3, 900, 51

[56] References Cited

U.S. PATENT DOCUMENTS

| | | | |
|---|---|---|---|
| 5,287,472 | 2/1994 | Hovst | 395/425 |
| 5,491,775 | 2/1996 | Madau et al. | 395/900 |
| 5,524,174 | 6/1996 | Eichfeld et al. | 395/3 |

*Primary Examiner*—George B. Davis
*Attorney, Agent, or Firm*—Finnegan, Henderson, Farabow, Garrett & Dunner, L.L.P.

[57] ABSTRACT

A digital fuzzy logic processor for generating output data representing a degree of membership function, specifically, a complement-generating circuit that generates complement data for outputting to a one's-complement circuit to determine a degree of membership output. The digital fuzzy logic processor includes an input port, a memory unit for storing a plurality of data and a prescaled base-distance-slope product table, a subtracting and multiplexer circuit to generate relative location signals and relative distance data, and a control unit that controls the processor. The logic processor further includes a pre-scale shifter to generate prescaled relative distance data, an address generator to generate a table address to retrieve a base-distance-slope product from the prescaled base-distance-slope product table, and a post scalar shifter to shift prescaled base-distance-slope products to generate complement data. Also included in the processor are a one's-complement circuit and a multiplexer to generate output data representing a degree of membership function.

4 Claims, 6 Drawing Sheets

FUZZY LOGIC MEMBERSHIP FUNCTION GENERATING APPARATUS

This Application is a Continuation-in-Part of application Ser. No. 08/053,081 filed on Apr. 26, 1993, now abandoned. The Inventors of all the claims of this CIP Application are the same as the Inventors of the pending application Ser. No. 08/053,081.

BACKGROUND OF THE INVENTION

1. Field of the Invention

This invention relates generally to the fuzzy logic control apparatus and method. More particularly, this invention relates to the method and circuit implementation on an integrated circuit chip for generating membership function to be used by a fuzzy logic control system.

2. Description of the Prior Art

As the fuzzy logic technique are being implemented more and more on the integrated circuit (IC) chips for application to a wide variety of control systems, it becomes more important to reduce the areas occupied by the logic circuits and the memory required for such implementations. The concept of fuzzy set theory was first published by Professor Zadeh in 1965. On the basis of the fuzzy set theory, a mathematical frame work is provided wherein a complex system which even though can not be precisely represented by 'crisp' and discrete functions, can be modeled for rigorous study and analysis. Therefore, by the use fuzzy logic, a technique is available to deal with systems wherein performance parameters are correlated with only imprecise relations, or system control criteria for which only vague and incomplete information is available.

Each fuzzy set has a corresponding membership function that associates a 'degree of membership' for a precise numerical value in the set. The membership function thus provides a mapping between the elements of a fuzzy sets and the numerical value representing the degree of membership.

The process of utilizing fuzzy logic for system control often involves the calculus of fuzzy if-then rules. The membership functions are usually constructed for such applications to correlate one of many control parameters to a corresponding degree of membership of a controlled system representing certain system characteristics. For a complex system, multiple membership functions are constructed in order to apply the fuzzy logic inference engine to control the system. The requirements of storing these membership function data in the memory and the processing time used to compute the degree of membership often impose limitations to their applicability for an IC implementation.

There are several prior art techniques which are applied for storing pertinent data and using the data for constructing the membership functions. The first technique is a conventional data array method wherein the membership functions are stored as a set of data arrays in the memory. A table lookup method is used for data retrieval. Such method provides high data access rate since no data processing is required. It also provides the flexibility to store and reconstruct membership functions for correlating the control parameters with system output in a wide variety of functional relationships. This method however requires greater amount of memory storage and thus may not be useful, especially for more complicate systems, for IC implementation.

Figure 1:
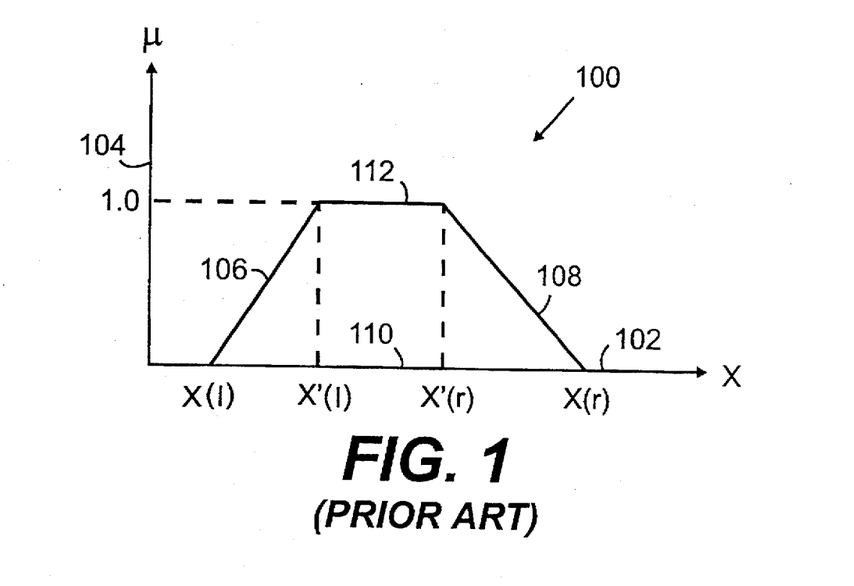
FIG. 1 shows a typical membership function which has a shape of trapezoid.

In order to circumvent this limitation imposed by the data array method in requiring large memory storage, another prior art method is disclosed. The membership function is first represented as simplified geometrical shapes which can be formulated by simple mathematical equations. As shown in FIGS. 1, the membership function is being represented as a trapezoid. Mathematical equations are used to define the functional relationships between the input variables and the degree of membership.

FIG. 1 shows a typical membership function 100 which has a shape of trapezoid. The trapezoid 100 is placed in a two dimensional x-μ plane where the abscissa, i.e., x-axis 102 is for the input variable and the coordinate, i.e., μ-axis 104, is for the degree of membership output. The slopes of the left side 106 and the right side 108 of the trapezoid are s(l) and s(r) respectively while the base 110 extends from x(l) to x(r) and the top 112 from x'(l) to x'(r). The trapezoid membership function 100 can be represented by the following equations:

$$\mu=0 \text{ for } x \leq x(l) \tag{1}$$

$$\mu=\text{MIN}\{1,[s(l)(x-x'(r))]\} \text{ for } x<x'(r) \tag{2}$$

$$\mu=\text{MAX}\{[1-s(r)(x-x'(r))],0\} \text{ for } x>x'(r) \tag{3}$$

Figure 2:
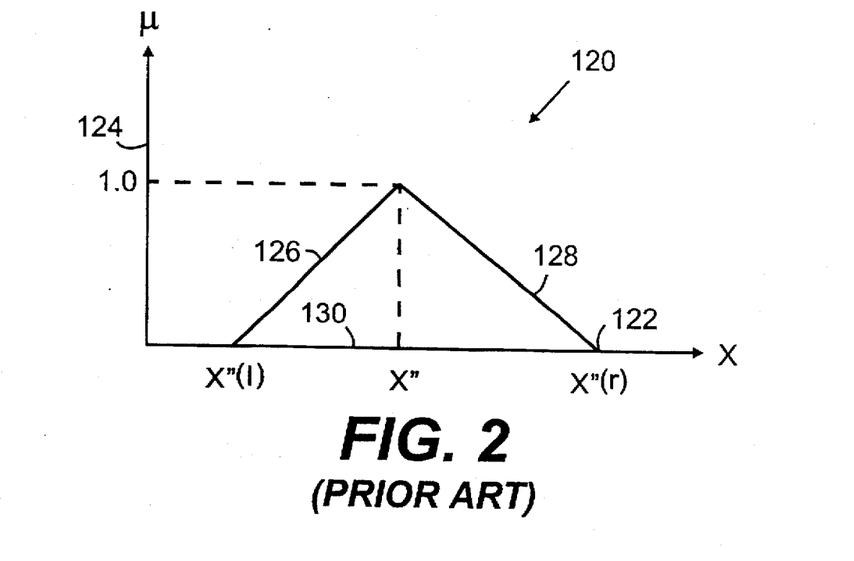
FIG. 2 shows another typical membership function which has a shape of triangle.

FIG. 2 shows a typical membership function 120 which has a shape of triangle. The triangle 120 is placed in a two dimensional x-μ plane where the abscissa, i.e., x-axis 122 is for the input variable and the coordinate, i.e., μ-axis 124, is for the degree of membership output. The slopes of the left side 126 and the right side 128 of the trapezoid are s(l) and s(r) respectively while the base 130 extends from x"(l) to x"(r) and the two sides of the triangle intersect at x"(t). The triangle membership function 120 can be represented by the following equations:

$$\mu=0 \text{ for } x \leq x"(l) \text{ \& } x \geq x"(r) \tag{4}$$

$$\mu=\text{MIN}\{1,[s(l)(x"(t)-x]\} \text{ for } x<x"(t) \tag{5}$$

$$\mu=\text{MIN}\{1,[s(r)(x-x"(t))]\} \text{ for } x>x"(t) \tag{6}$$

A trapezoid according to the methods described above require at least four numbers stored in the memory. Similarly, four numbers are also used for the triangle membership function 120. For the reconstruction of the membership functions, i.e., the trapezoids and the triangle, a multiplication circuit must be utilized. The circuit for multiplication, when implemented on an IC chip, occupies large area on an IC chip. Meanwhile, the multiplication operation is more time consuming thus slows down the data process speed and the entire control system.

Nakamura disclosed in U.S. Pat. No. 5,179,629 entitled 'Device for Computing Membership Functions in Fuzzy Computers', a fuzzy computer which includes a a control portion for generating control information to define the membership function, an operating unit for perating input data in accordance with the control inforantion, a comparator for comparing operation results of the operating unit with a predetermined value which is based on the control inforamtion, and a data selector for selecting according to the comparison results from the comparator, either the operation results of the operation means or the predetermined value which is based on the control infromation. Nakamura's 'operating unit' in the fuzzy computer performs the basic operations of computing $f(x)=\Delta X*2^m$ where $\Delta X$ is obtained by carrying out a subtraction opration and $\Delta X*2^m$ is then obtained by a bit-shifting operaion where $2^m$ is the slope and m is retrieved from the 'control portion' of the fuzzy computer. The comparator and selector then determine the final value of the fuzzy membership function depending on where the input X is located relative to the membership function.

For the control of more sensitive operational functions, Nakamura's fuzzy computer may not be sufficiently accurate by its use of a single set of slopes, i.e., $2^m$. In certain range and under certain operation conditions, the membership function may change according to a slope, i.e., rate of changes, as fraction of $2^m$. Under that conditions, the structure of Nakamura's computer would not be able to properly perform the membership operation by its 'operating unit' unit to obtain the membership function with sufficient accuracy by its simple bit-shifting operation.

Therefore, a need still exists in the art of fuzzy control system for an improved technique to process the membership function with reduced memory requirement on the IC chip and a higher processing speed while be able to satisfy the accuracy requirements in order to overcome these limitations.

SUMMARY OF THE PRESENT INVENTION

One object of the present invention is to teach a method and a circuit implementation to process the membership functions whereby the limitations as encountered by the prior art can be overcome.

Another object of the present invention is to provide a membership processing method and apparatus which does not require great volume of data storage and utilizes simplified computations such that the method can be implemented on an IC chip to achieve higher processing through-put.

Another object of the present invention is to provide a membership processing method and apparatus which allows the use of multiple sets of slopes, i.e., rates of change, by combining the bit-shifting and table-lookup techniques such that the more accurate output data of membership function can be generated.

Another object of the present invention is to provide an IC device for processing the membership functions with simplified computation thus allowing the device to be manufactured in large quantity at low cost such that broad applications of the apparatus to many types of fuzzy control circuits may be achieved.

Briefly, in a preferred embodiment, the present invention discloses a digital fuzzy logic processor for generating an output data representing a degree of membership which includes an input port for receiving an input data X and a slope type and a slope count N. It also includes a memory unit for storing a plurality of beginning and end point data, the memory unit further storing a prescaled base-distance-slope product table including a plurality of prescaled base-distance-slope products. The digital processor further includes a subtracting and multiplexer circuit for subtracting the input data X from the plurality of beginning and end point data for generating a relative location signal and a relative distance data. The digital processor further includes a control unit for controlling the digital processor by transmitting the relative-location signal, the slope type signal, the slope-selection count N. The digital processor further includes a pre-scale shifter controlled by the relative-location signal for shifting an inputted relative distance data by −K bits for generating a prescaled relative distance data. The digital processor further includes an address generator for receiving a type of slope signal and the prescaled relative distance data for generating a table address for retrieving a selected prescaled base-distance-slope product from the prescaled distance-slope product table. The digital processor further includes a post scalar shifter controlled by the slope selection count N for shifting the selected prescaled base-distance-slope product by the N+K bits to the right to generating a complement data. The digital processor further includes a one's complement circuit for applying the complement data for generating a one's complement data. The digital processor further includes a multiplexer for applying the relative location signal and the one's complement to generate the output data representing a degree of membership.

One advantage of the present invention is that it teaches a method and a circuit implementation to process the membership functions whereby the limitations as encountered by the prior art can be overcome.

Another advantage of the present invention is that it provides a membership processing method and apparatus which does not require great volume of data storage and utilizes simplified computations such that the method can be implemented on an IC chip to achieve higher processing through-put.

Another advantage of the present invention is that it provides a membership processing method and apparatus which allows the use of multiple sets of slopes, i.e., rates of change, by combining the bit-shifting and table-lookup techniques such that the more accurate output data of membership function can be generated.

Another advantage of the present invention is that it provides an IC device for processing the membership functions with simplified computation thus allowing the device to be manufactured in large quantity at low cost such that broad applications of the apparatus to many types of fuzzy control circuits may be achieved.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

For the purpose of describing the present invention, the membership functions are assumed to be either trapezoid or triangle in shape as shown in FIGS. 1 and 2. However, the apparatus and method disclosed in this invention can be broadly applied to membership functions of different shapes, e.g., polygons. It is not the intent of this application to limit the scope of the present invention to trapezoid and triangle membership functions.

Referring to FIG. 1 again, the trapezoid membership function 100 is now represented by the following formulation in the present invention:

$$\mu=1 \text{ for } x'(l) \leq x \leq x'(r) \quad (8)$$

$$\mu=MAX\{[1-s(r)(x-x'(r)],0\} \text{ for } x>x'(r) \quad (9)$$

$$\mu=MAX\{[1-s(l)(x'(l)-x],0\} \text{ for } x<x'(l) \quad (10)$$

Where X is the input variable and the slopes, i.e., s(l) and s(r) and the dimension of the top of the trapezoid 100, i.e., left and right coordinates, i.e., X'(l) and X'(r) respectively are the same as defined above.

Referring to FIG. 2, the triangle membership function 120 is now represented by the following formulation in the present invention:

$$\mu=MAX\{[1-s|x-x''(t)|],0)\} \quad (11)$$

where:

$$s=s'(l) \text{ for } x \leq x''(t) \quad (12)$$

$$s=s'(r) \text{ for } x \geq x''(t) \quad (13)$$

In order to reduce the data storage memory on an IC chip, the slopes, i.e., s(l) and s(r) for the trapezoid and s'(l) and s'(r) for the triangle are stored and processed in a special method described below such that the left and right pair of slopes for both the trapezoid and the triangle are now encoded and stored as one data entry. Therefore, according to the present invention, only three data entries, i.e., one encoded slope data and x'(l) and x'(r) are required for re-constructing the trapezoid membership function 100. Similarly, only two data entries, i.e., the encoded slope data and x''(t), are required for the reconstruction of the triangle membership function 120.

Figure 3:
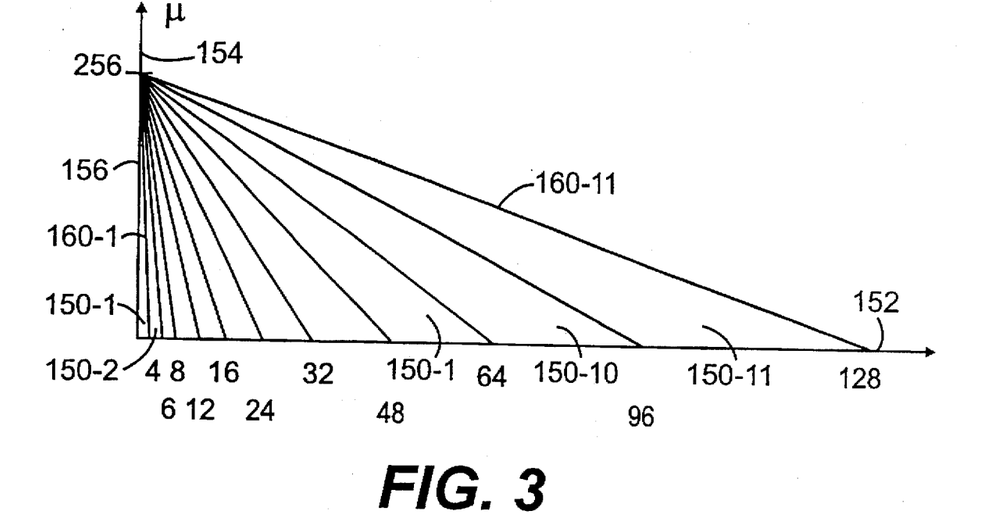
FIG. 3 shows a plurality of triangles wherein one side of these triangles has different slopes for each of these triangles to illustrate the slope encoding method.

For the purpose of illustrating the slope encoding method, referring to FIG. 3, where a plurality of triangles, i.e., triangles 150-1, 150-2, . . . ,150-10 are shown. These triangles are disposed on a two dimensional plane with a x-axis 152 and $\mu$-axis 154. These triangles have a common side 156 along the $\mu$-axis which has a height of 256, i.e., $2^8$. Each of these triangles has a different length of base, i.e., 158-1, 158-2, 158-3, . . . 158-11 along the x-axis 152. By arranging the length of bases of theses triangles to be $2^m$ where m=2,3,4, . . . , 8, i.e., 4, 8, 16, . . . , 256, the third side of these triangles, i.e., 160-1, 160-2, . . . , 160-11 all have different slopes s(i) where i=1, 2, 3, . . . , 11. The value these slopes are $1/2^m$ where m=0, 1, 2, 3, . . . 7. In order to encode the slopes of the membership functions, two sets of slopes are used. The first set has a value of $1/2^m$ and the second set has values of $1/(3*2^m)$, where m=0, 1, 2, 3, . . . 7. Each membership function, either a trapezoid or triangle, the slopes of the left and right sides, i.e., s(l) and s(r) for the trapezoid 100 and s'(l) and s'(r) for the triangle 120, are approximated by one among these sixteen slopes. Since the slopes among each set has a $2^n$ relationship, a shift register can be used to obtain the value once a base value of any one slope is known for each set.

The values of these slopes are arranged in a sequential order as listed in Table 1.

TABLE 1

| No. | 0 | 1 | 2 | 3 | 4 | 5 | 6 | 7 |
|---|---|---|---|---|---|---|---|---|
| base-length (Type 0) | 1 | 2 | 4 | 8 | 16 | 32 | 64 | 128 |
| base-length (Type 1) | 0 | 4/3 | 8/3 | 16/3 | 32/3 | 64/3 | 128/3 | 256/3 |

Figure 4:
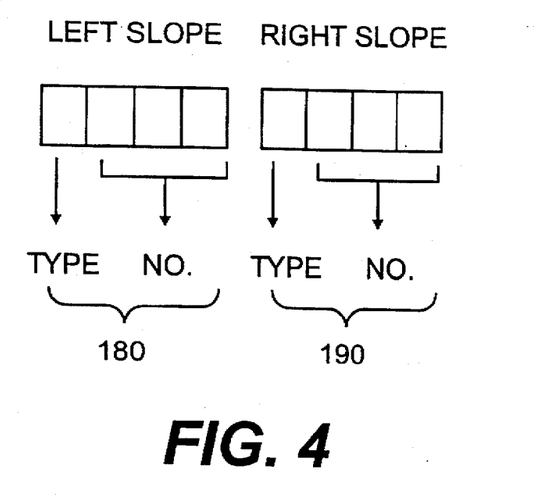
FIG. 4 shows an eight bit code for encoding the slope of a membership function.

By utilizing the approximated slopes as illustrated in FIG. 3, the left and right slopes of the trapezoid or triangle are encoded by an eight bit number as shown in FIG. 4. The first four bits 180 are used to encode the left slope and the second four bits 190 for the right slopes. The first bit and the fifth bit is used to indicate the type, i.e., either type 0 or type 1 in Table 1. The second to the fourth bits for the left slope, and the sixth to the eighth bits for the right slope are used to indicate which slope it is in Table 1. By storing a base value of any one slope of type zero or type one in Table 1, the value of another slope can be obtained by shift K-L bits to the right if the result is positive and to the left if negative, where L is the number of base-value slope stored in the memory and K is the number of the slope to be computed, i.e., $$s=s_B 2^{(K-L)} \quad (14)$$

Where S is the slope value to be computed and the $S_B$ is the base slope value for the specific type stored in the memory.

Figure 5:
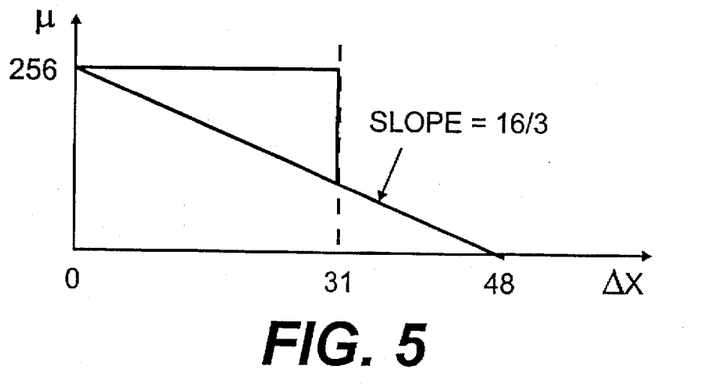
FIG. 5 shows a geometrical diagram to illustrate the encoding method of the product of a side-slope and a base-length of a triangle.

To compute the membership of a parameter which has a triangle membership function, according to Equation (4), an operation of:

$$\mu(x)=MAX\{0,[1-s|x-x''|]\} \quad (15)$$

$$=MAX\{0,(1-s\Delta x)\} \quad (16)$$

is to be performed. For the purpose of increasing the processing speed, the computation of $\mu(x)$ is further simplified such that the value of $[1 -s\Delta x]$ can be conveniently obtained by use of shift registers. Referring to FIG. 5, where the slope of 16/3 in Table 1 is shown as the base slope and a base product of $(16/3) \Delta x$ with the value of $\Delta X_B$ ranging from zero to 31 is illustrated. A relationship can be established between a slope S' and $\Delta X'$ with that of the base slope and base product.

$$S'=2^N*S_B \quad (17)$$

$$\Delta X'=2^K \Delta X_B \quad (18)$$

where N and K are integers and $\Delta X_B$ is less than 31. The value of $\mu$ can therefore be represented as:

$$\mu=1-S'\Delta X'=1-2^{N+K}S_B\Delta X_B \text{ if } 2^{N+K}S_B\Delta X_B<1 \quad (19)$$

$$=0 \text{ if } 2^{N+K}S_B\Delta X_B \geq 1 \quad (20)$$

The value of $\mu$ can be computed by first obtaining the value of $S_B \Delta X_B$ from the memory, and the value of N+K can be obtained by table lookup method using the input data of S' and the computed $\Delta X$. Tables 2 and 3 show the values of N and K as a function of the code for the slope (FIG. 4) and the value of $\Delta X$. The value of $\mu$, i.e., $(1-2^{N+K}S_B \Delta X_B)$, can be computed by shifting (N+K) bits from the value of $S_B \Delta X_B$ to obtain the value of $2^{N+K}S_B \Delta X_B$, and by subtracting that number from 1. Similar method can be used by choosing other slopes or $\Delta X$ as the base and apply Equations (12) and (13).

TABLE 2

| No. | 000 | 001 | 010 | 011 | 100 | 101 | 110 | 111 |
|---|---|---|---|---|---|---|---|---|
| N | −3 | −2 | −1 | 0 | 1 | 2 | 3 | 4 |

TABLE 3

| First 3-bit of ΔX | Value of K |
|---|---|
| 000 | 0 |
| 001 | 1 |
| 01x | 2 |
| 1xx | 3 |

Figure 6:
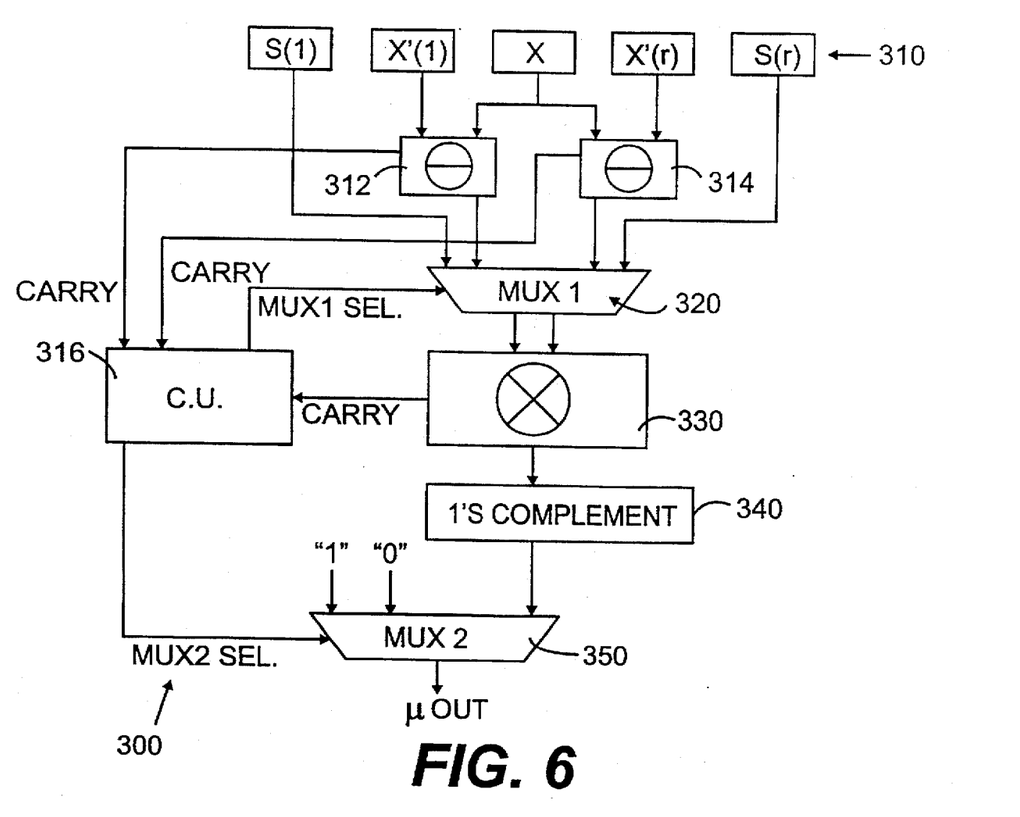
FIG. 6 shows a block diagram of a membership function processor for a trapezoid membership function.

FIG. 6 shows a block diagram of a membership processor 300 for a trapezoid membership function, wherein the required input variables as stored in the memory of the data processor and the logic circuits for performing the processes for building a trapezoid membership function are shown. The membership function processor 300 has an input port 310 to receive five input variables of the trapezoid. These five input variables are S(l), S(r), X'(l), X'(r), and X and the definition of each input variable is the same as provided in Equations (8) to (10). The input variable X, X'(l) and X'(r) are processed by two subtracting means 312 and 314 to compute [X−X'(r)] and [X'(l)−X] respectively. A carryunder (CU) processing means 316 is used to process the carry under for these two subtracting operations. The results of [X−X'(r)] and [X'(l)−X] together with the carryunder and the input slopes S(l) and S(r) are used by the first multiplexing means 320. The first multiplexing means 320 determines the closest approximation of the values of [X−X'(r)] and [X'(l)−X] so that the values can be approximated as $\Delta X' = 2^K \Delta X_B$ in accordance with Equation (18). The multiplexing means 320 further encodes the slopes by expressing each of the slopes using two eight-bit data as shown in Table 1 and FIG. 4. The left and right slopes and the results obtained from the subtracting operations performed by the subtracting processing means 314 and 316 are now approximated and encoded as $S' = 2^N * S_B$ and $\Delta X' = 2^K \Delta X_B$. (See Equations 17 and 18)

In order to compute the value of μ, the values of S'ΔX', i.e., the multiplication of slopes and ΔX' must be computed. A multiplication processing means 330 is used which performs simple shift operations to compute $2^{N+K} S_B \Delta X_B$ in accordance with Equations 19 and 20. The multiplication can be computed by simply shifting (N+K) digit without requiring actual performing the multiplication. A '1's compliment processing means 340 is used to compute the values of [1−s(r)(x−x'(r))] and [1−s(l)(x'(l)−x)] where the products of S' to ΔX' are computed as approximate values $2^{N+K} S_B \Delta X_B$ by the multiplication processing means 330.

A second multiplexing means 350 then performs the final determination of the value of μ by the use of the carryunder and by selecting the values of μ where μ is $1-2^{N+K} S_B \Delta X_B$, if $2^{N+K} S_B \Delta X_B < 1$ and μ=0 if $2^{N+K} S_B \Delta X_B \geq 1$. (See Equations 19 and 20).

Figure 7:
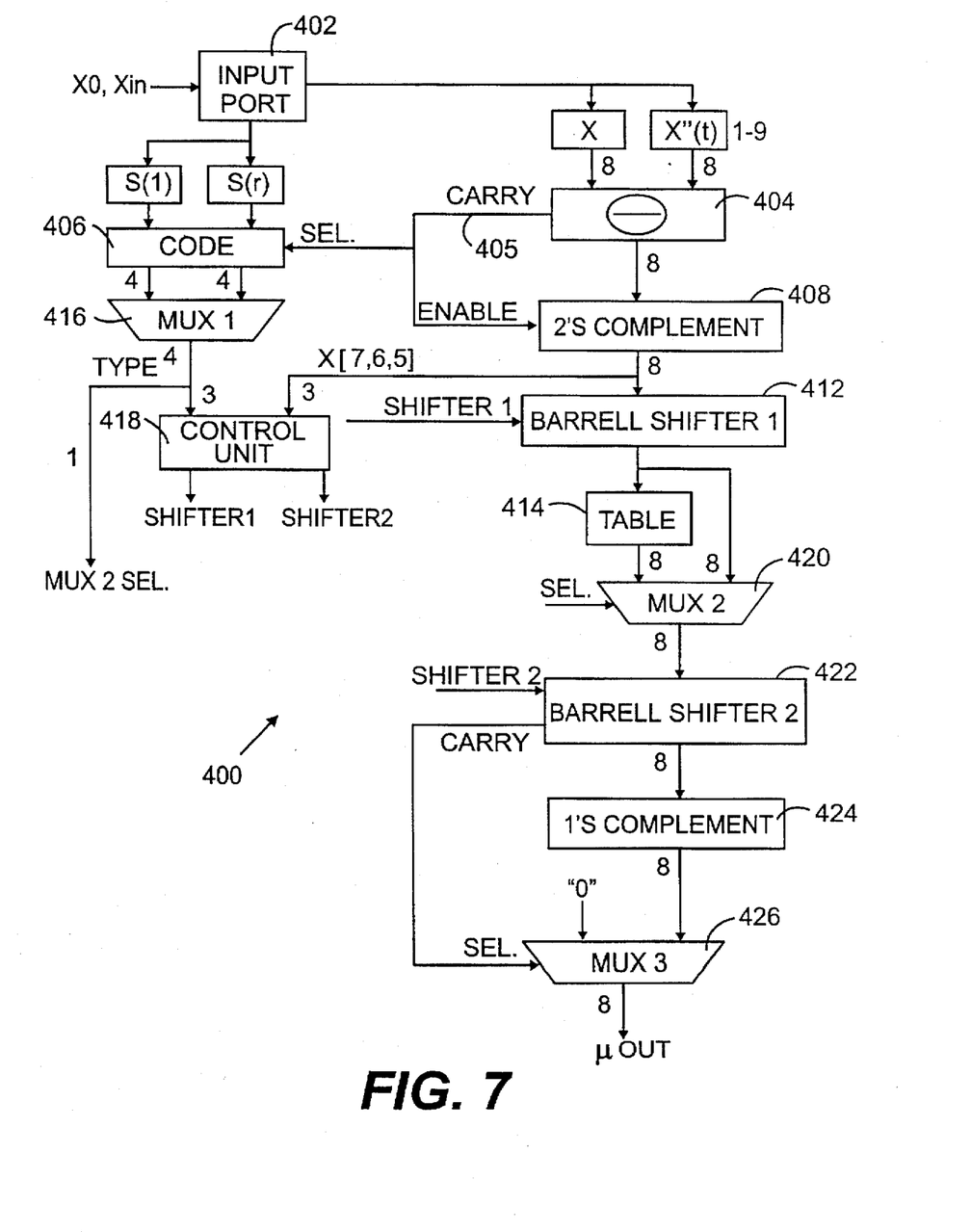
FIG. 7 shows a block diagram of another membership function processor for a triangle membership function.

FIG. 7 is a similar but more detail illustration of the circuit block diagram for a membership-function co-processor 400 implementing on an IC chip for the determination of a degree of membership of an input X for a triangle membership function μ(x). The triangle membership function is represented by Equation (5) wherein the degree of membership function μ(x) is expressed as function of three numbers, i.e., x"(t), s(r), and s(l). The co-processor 400 includes an input port 402 to receive four input parameters, i.e., x, x"(t), s(r) and s(l). Two of these input data, i.e., x and x"(t) are received by a subtracting means 404 to compute the value of [x−x"(t)]. A carry bit 405 is generated which is used to control a slope coding means 406 and a 2's complimenting means 408. The carry bit 405 is zero when x≥x"(t) and the carry bit 405 is one when x<x"(t). When the carry bit 405 is zero, the slope coding means 406 selects and encodes the right slope, i.e., s(r), and the enable bit input 407 to the 2's complementing means 408 is set to zero which turns off the functioning of the 2's complementing means 408 and the value of [x−x"(t)] is kept unchanged. On the other hand, when the carry bit 405 is one, the slope coding means 406 selects and encodes the left slope, i.e., s(l), and the enable bit input 407 to the 2's complementing means 408 is set to one which enables the 2's complementing means 408 and a 2's complement value of [x−x"(t)] is generated.

The output from the 2's complementing means 408 is then processed by the first Barell shifter 412 to convert the value of [x−x"(t)] into $\Delta X' = 2^K \Delta X_B$ where K is an integer and $\Delta X_B$ is less than 31 (see Equation 18). The value of K is determined by the first Barrell shifter 412 which received a select input from a control unit 418 (to be described below). An appropriate $\Delta X_B$ is determined by the use of a table lookup means 414 whereby the value of [x−x"(t)] is best approximated by the value $2^K \Delta X_B$. The output of the first Barrell shifter 412 is multiplied by 8, i.e., by adding three zeros to the end, to normalized the maximum value of the membership function to 255, i.e., [(8×32)−1].

The slope either s(r) or s(l) as selected by the slope coding means 406 is used by a first multiplex means 416 to generate a three bit output which is received by a control unit 418 to process a parameter, i.e., a shifter 2 input, in order to determine the value of N in $S' = 2^N * S_B$ (see Equation 17). The first multiplex means 416 also generate a one bit output which is the most significant bit of the slope and is used to control a second multiplex means 420 to determine a slope type which is either type zero or one as described in Table 1. The control unit 418 also receives the three most significant bits, i.e., bits 7,6, and 5, of [x−x"(t)] to generate a selection input to the first Barrell shifter for the determination of K according to Table 3. A second output is generated by the control unit 418 which is used to control a second Barrell shifter 422 to compute a value of N according to Table 2. as described above. The second Barrell shifter then generates a normalized value of $2^{(N+K)} S_B \Delta X_B$. A 1's compliment means 424 is used to compute the value of $[1-2^{N+K} S_B \Delta X_B]$. The second Barrell shifter 422 also generates an overflow output which is used to control a third multiplex means 426 to generate an output of zero when the value of $2^{N+K} S_B \Delta X_B$ is greater than 255. Otherwise the computed value of $[1-2^{N+K} S_B \Delta X_B]$ is the value for the final output of an degree of membership function μ(x).

Figure 8:
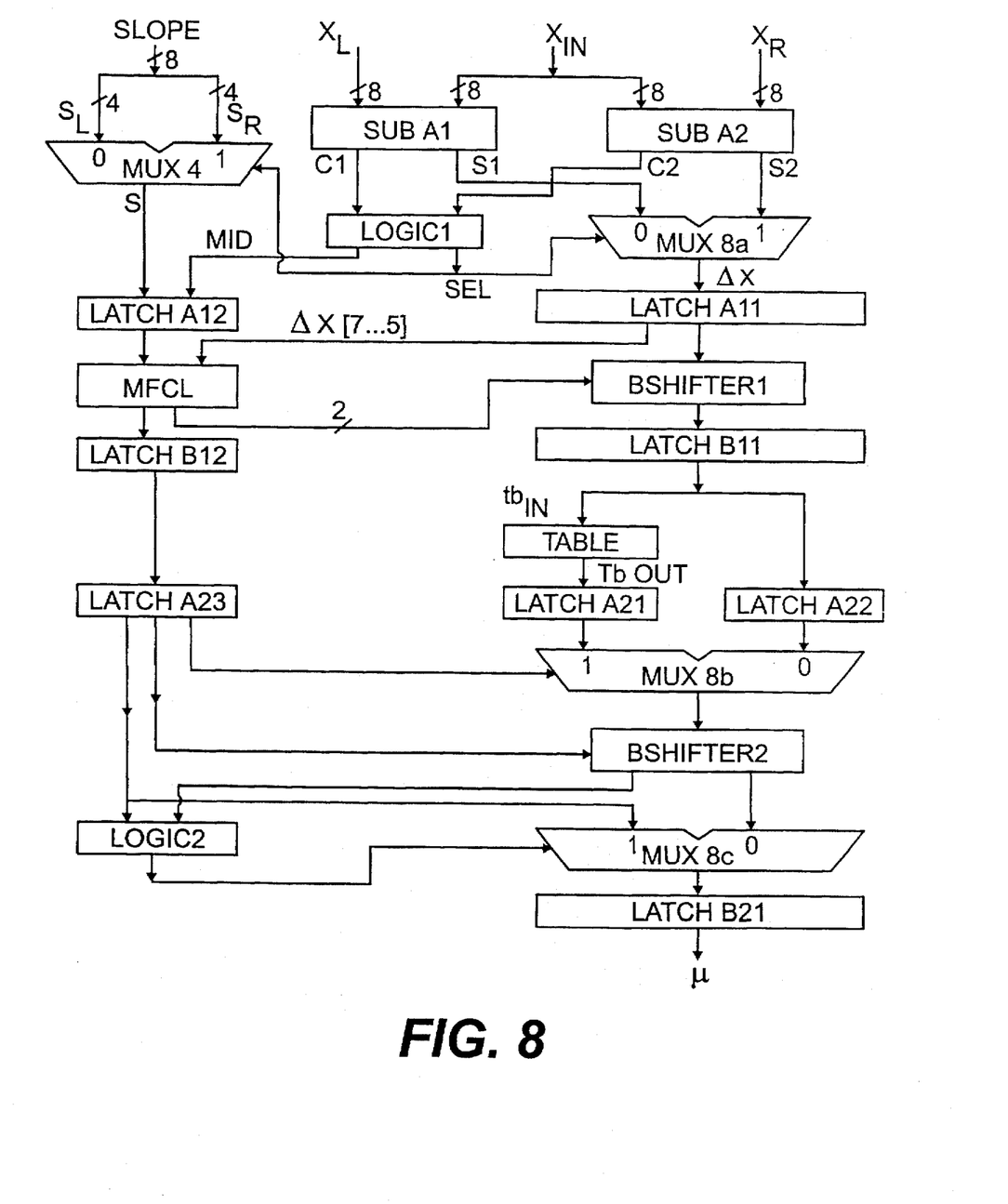
FIG. 8 shows a detail circuit block diagram of the membership function processor of FIG. 6 for circuit implementation.

FIG. 8 is a circuit block diagram to show a circuit implementation of the membership processor 300 as that shown in FIG. 6 for a trapezoid membership function. This membership function processor is basically an eight-bit processor. Three input parameters $X_L$, $X_R$, and $X_{IN}$ are received and processed by subtractors SUB A1 and SUB A2 to obtain the values of $(X_{IN}-X_L)$ and $(X_{IN}-X_L)$. Based on these values, MUX 8a and LOGIC1 determine that $X_{IN}$ is on which section, i.e., left, middle, or right sections, of the trapezoid. A multiplexer MUX 4 applies the output from LOGIC 1 to select a slope between two input slopes, i.e., the left slope $S_L$ or the right slope $S_R$. A plurality of latches are used, i.e., LATCH A11, LATCH A12, LATCH B11, LATCH B12, LATCH A21, LATCH A22, LACH A23, and LATCH B21 for temporary latching data therein to synchronize the data processings between different parts of the circuits. A MFCL circuit block, i.e., membership function control logic, receives input parameters generated from MUX 4 and MUX 8a via LATCH A12 and LATCH A11 respectively for determining the number of bits to be shifted and then provided these bit-shifiting numbers via LATCH B12, LATCH A23, and LOGIC2 in different stages of data processes as described below. According to the value of ΔX, barrel shifter BSHIFTER1 performs a bit shifting operation to obtain the approximate value of ΔX as $\Delta X_B$ shifted by n2 bits, i.e., $2^{n2} \Delta X_B$ thus simplifed the ciruit and the operations by replacing multiplication by bit-shifting. The process of slope encoding is handled by circuit blocks TABLE, LATCH A21, LATCH A22 and MUX 8b. Depending on the approximation of the slope is to be encoded on the basis of $2^N$ or $2^N/3$, a code is generated for the approximated slope. Base on the value of this encoded slope, barrel shifter BSHIFTER2 performs a bit-shifting operation. By use of the approximated values of slope and ΔX, LOGIC2 and MUX 8c then performs a determination of a final approximated membership function value μ for output via LATCH B21. The circuit requirements for this membership function processor is much more simplified compared to conventional processors.

Figure 9:
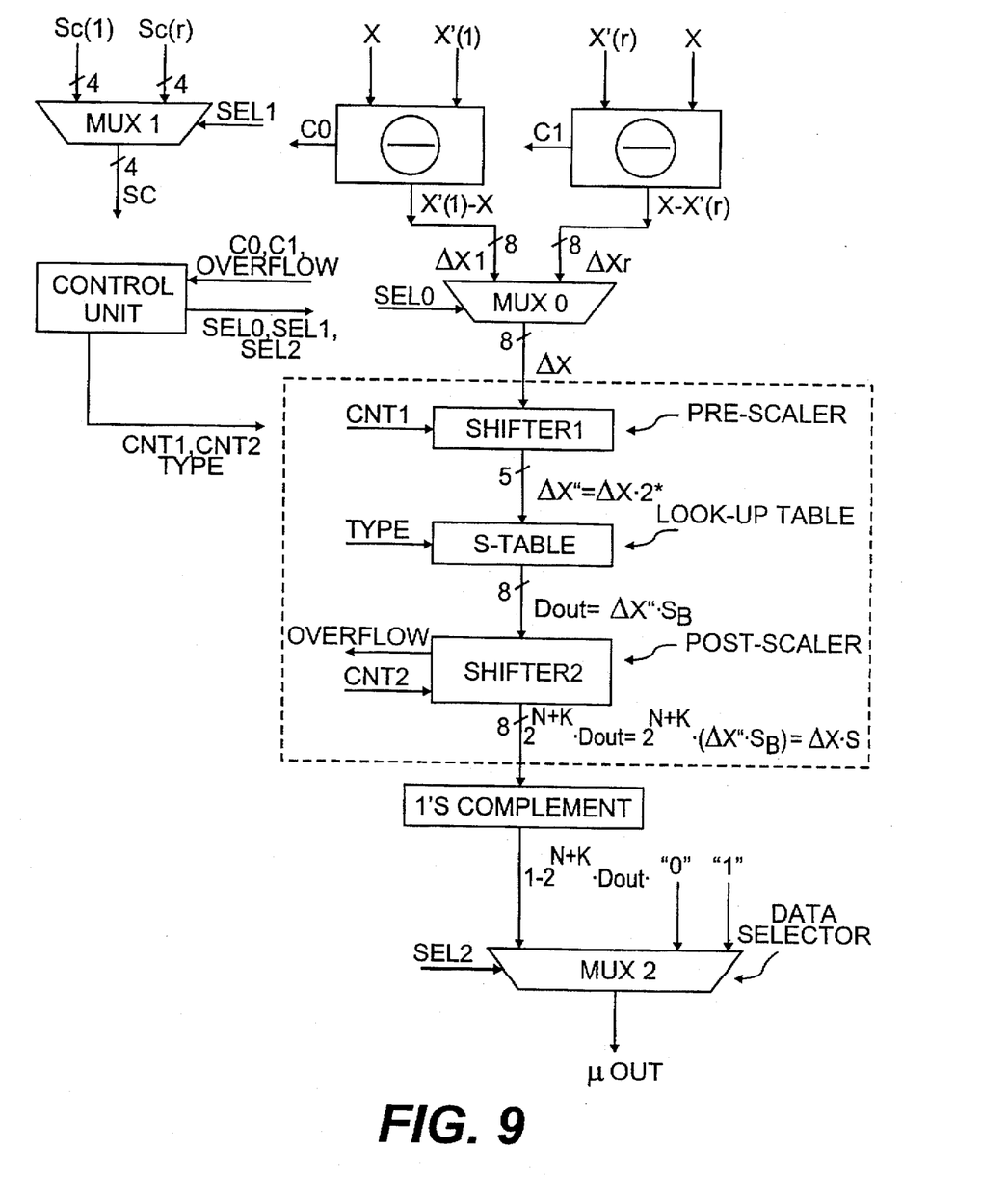
FIG. 9 shows a functional block diagram for a preferred embodiment of the present invention.

FIG. 9 is a functional block diagram to particularly show the inventive features of the membership processor 300 as that shown in FIG. 6 for a trapezoid membership function. As shown both in FIGS. 6 and 8, five input parameters, i.e., S(L), S(R), X, X(L), and X(R), are received and the operations of subtraction, i.e., X(L)–X and X–X(R), are first performed to generate ΔX(L) and ΔX(R) and two carryunder parameters $C_0$ and $C_1$. The carryunder parameters $C_0$ and $C_1$ together with the left and right slopes, i.e., S(L) and S(R), are received by a multiplexer MUX1 to select an input-related slope S'. A control unit receives the input related slope S', the carryunder parameters ΔX(L) and ΔX(R) to generate five control signals, i.e., sel-0, sel-1, sel-2, cut-1, and cnt-2. A multiplexer MUX0 receives the left and right distances, i.e., ΔX(L) and ΔX(R), and the control signal sel-0 to select an input-related distance ΔX. The input-related distance and the control signal cnt-1 is first received by a pre-scalar circuit, i.e., shifter1, to determine an input related base-distance ΔX" by shifting a factor –K bits, i.e., $\Delta X" = \Delta X * 2^{-K}$. According to the type of slopes selected, a table-lookup function is performed to obtain Dout $= \Delta X" * S_B$. Then a post scalar operation is performed by shifting N+K bits to the right to obtain $2^{N+K} D_{OUT} = 2^{(N+K)}(\Delta X" * S_B) = \Delta X * S$. A 1's compliment is then performed and a data selection is applied by using MUX2 to obtain a final output of the membership function. This membership function processor is implemented with a hardware structure with the number of bits in data transmission from one functional block to another marked out.

Thus the present invention discloses a complement-generating circuit for generating a complement data for outputting to an one's complement circuit to determine a degree of membership output. The complement-generating circuit includes a control unit for controlling the complement-generating circuit by transmitting a relative-location signal, i.e., cnt1, a slope type signal, i.e., type, and a slope-selection count N, i.e., cnt2. The complement-generating circuit further includes a memory unit for storing a prescaled base-distance-slope product table including a plurality of prescaled base-distance-slope products. The complement-generating circuit also includes a pre-scale shifter, i.e., shifter1, controlled by the relative-location signal, i.e., cnt1, for shifting an inputted relative distance data by –K bits for generating a prescaled relative distance data. The complement-generating circuit also includes an address generator, i.e., S-table, for receiving a type of slope signal and the prescaled relative distance data for generating a table address for retrieving a selected prescaled base-distance-slope product from the prescaled distance-slope product table. The complement-generating circuit further includes a post scalar shifter, i.e., shifter2, controlled by the slope selection count N for shifting the selected prescaled base-distance-slope product by N+K bits to the right to generating the complement data.

This invention further discloses a digital fuzzy logic processor for generating an output data representing a degree of membership which includes an input port for receiving an input data X and a slope type and a slope count N, It also includes a memory unit for storing a plurality of beginning and end point data, the memory unit further storing a prescaled base-distance-slope product table including a plurality of prescaled base-distance-slope products. The digital processor further includes a subtracting and multiplexer circuit for subtracting the input data X from the plurality of beginning and end point data for generating a relative location signal and a relative distance data. The digital processor further includes a control unit for controlling the digital processor by transmitting the relative-location signal, the slope type signal, the slope-selection count N. The digital processor further includes a pre-scale shifter controlled by the relative-location signal for shifting an inputted relative distance data by –K bits for generating a prescaled relative distance data. The digital processor further includes an address generator for receiving a type of slope signal and the prescaled relative distance data for generating a table address for retrieving a selected prescaled base-distance-slope product from the prescaled distance-slope product table. The digital processor further includes a post scalar shifter controlled by the slope selection count N for shifting the selected prescaled base-distance-slope product by the N+K bits to the right to generating a complement data. The digital processor further includes a one's-complement circuit for applying the complement data for generating a one's complement data. The digital processor further includes a multiplexer for applying the relative location signal and the one's complement to generate the output data representing a degree of membership.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A complement-generating circuit for generating complement data for outputting to a one's-complement circuit to determine a degree of membership output, said complement-generating circuit comprising:

a control unit for controlling said complement-generating circuit by transmitting a relative-location signal, a slope type signal, and a slope-selection count N;

a memory unit for storing a prescaled base-distance-slope product table including a plurality of prescaled base-distance-slope products;

a pre-scale shifter controlled by said relative-location signal for shifting an inputted relative distance data by –K bits for generating a prescaled relative distance data;

an address generator for receiving a type of slope signal and said prescaled relative distance data for generating a table address for retrieving a selected prescaled base-distance-slope product from said prescaled base-distance-slope product table; and a post scalar shifter controlled by said slope selection count N for shifting said selected prescaled base-distance-slope product by a sum of said N and K bits to the right for generating said complement data.

2. The complement-generating circuit of claim 1 wherein: said memory unit being provided for storing said prescaled base-distance-slope product table including a plurality of prescaled base-distance-slope products corresponding to a plurality of said slope type signals.

3. The complement-generating circuit of claim 2 wherein: said control unit being provided for inputting and selecting a selected one of said slope type signals.

4. A digital fuzzy logic processor for generating output data representing a degree of membership comprising:

an input port for receiving an input data X and a slope type and a slope count N;

a memory unit for storing a plurality of beginning and end point data, said memory unit further storing a prescaled base-distance-slope product table including a plurality of prescaled base-distance-slope products;

a subtracting and multiplexer circuit for subtracting said input data X from said plurality of beginning and end point data for generating a relative location signal and relative distance data;

a control unit for controlling said digital processor by transmitting said relative-location signal, said slope type signal, and said slope-selection count N;

a pre-scale shifter controlled by said relative-location signal for shifting inputted relative distance data by $-K$ bits for generating prescaled relative distance data;

an address generator for receiving a type of slope signal and said prescaled relative distance data for generating a table address for retrieving a selected prescaled base-distance-slope product from said prescaled base-distance-slope product table;

a post scalar shifter controlled by said slope selection count N for shifting said selected prescaled base-distance-slope product by a sum of said N and K bits to the right for generating a complement data;

a one's-complement circuit for applying said complement data for generating a one's complement data; and a multiplexer for applying said relative location signal and said one's complement to generate said output data representing a degree of membership.

* * * * *